(12) United States Patent
Kim et al.

(10) Patent No.: US 10,162,061 B2
(45) Date of Patent: Dec. 25, 2018

(54) GLOBAL NAVIGATION SATELLITE SYSTEM (GNSS) NAVIGATION SOLUTION GENERATING APPARATUS AND METHOD

(71) Applicant: Electronics and Telecommunications Research Institute, Daejeon (KR)

(72) Inventors: Tae Hee Kim, Daejeon (KR); Jae Hoon Kim, Daejeon (KR); Cheon Sig Sin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 342 days.

(21) Appl. No.: 15/003,127

(22) Filed: Jan. 21, 2016

(65) Prior Publication Data
US 2016/0223678 A1    Aug. 4, 2016

(30) Foreign Application Priority Data

Feb. 2, 2015 (KR) .................. 10-2015-0016119

(51) Int. Cl.
*G01S 19/21*    (2010.01)
*G01S 19/31*    (2010.01)
*G01S 19/48*    (2010.01)

(52) U.S. Cl.
CPC ............ *G01S 19/215* (2013.01); *G01S 19/21* (2013.01); *G01S 19/31* (2013.01); *G01S 19/48* (2013.01)

(58) Field of Classification Search
CPC ........ G01S 19/215; G01S 19/21; G01S 19/29; G01S 19/30; G01S 19/31
USPC ............. 342/357.59, 357.68, 357.69, 357.71
See application file for complete search history.

(56) References Cited

U.S. PATENT DOCUMENTS

| 5,557,284 | A  | * | 9/1996 | Hartman | G01S 19/215 342/352 |
| 7,800,533 | B2 | * | 9/2010 | Harper  | G01S 19/215 342/357.58 |
| 7,940,213 | B2 | * | 5/2011 | Harper  | G01S 19/215 342/357.59 |
| 7,952,519 | B1 | * | 5/2011 | Nielsen | G01S 19/215 342/357.59 |

(Continued)

FOREIGN PATENT DOCUMENTS

KR    101366819 B1    3/2014
KR    1020140044048 A    4/2014

OTHER PUBLICATIONS

Sherman Lo et al., "Signal Authentication A Secure Civil GNSS for Today," InsideGNSS, Sep.-Oct. 2009, pp. 30-39.

*Primary Examiner* — Chuong P Nguyen
(74) *Attorney, Agent, or Firm* — William Park & Associates Ltd.

(57) ABSTRACT

Provided is a global navigation satellite system (GNSS) navigation solution generating apparatus and method, the apparatus including a determiner to determine that a spoofing signal exists in a received GNSS signal when a signal having a receiving intensity greater than a predetermined receiving intensity of a normal signal by a predetermined value range is included in the received GNSS signal, a detector to re-detect the normal signal from the GNSS signal when the spoofing signal is determined to exist, and a calculator to generate a GNSS navigation solution by tracking the re-detected normal signal, wherein the predetermined value range is 3 to 5 decibels (dB).

15 Claims, 7 Drawing Sheets

(56) References Cited

U.S. PATENT DOCUMENTS

| | | | | |
|---|---|---|---|---|
| 8,159,391 | B2* | 4/2012 | Papadimitratos | G01S 19/20 |
| | | | | 342/357.59 |
| 8,325,087 | B2* | 12/2012 | Thomson | G01S 19/215 |
| | | | | 342/357.43 |
| 8,922,427 | B2* | 12/2014 | Dehnie | G01S 19/47 |
| | | | | 342/357.3 |
| 9,075,137 | B2* | 7/2015 | Wendel | G01S 19/03 |
| 9,383,449 | B2* | 7/2016 | Kim | G01S 19/215 |
| 9,689,686 | B1* | 6/2017 | Carmack | G01C 21/20 |
| 9,689,989 | B2* | 6/2017 | Trautenberg | G01S 19/215 |
| 9,725,171 | B1* | 8/2017 | Carmack | B64C 39/024 |
| 2010/0149031 | A1* | 6/2010 | Dawson | G01S 5/0036 |
| | | | | 342/357.31 |
| 2011/0030055 | A1* | 2/2011 | Balay | H04L 63/1416 |
| | | | | 726/22 |
| 2011/0068973 | A1 | 3/2011 | Humphreys et al. | |
| 2013/0271316 | A1* | 10/2013 | Trautenberg | G01S 19/215 |
| | | | | 342/357.59 |
| 2014/0086374 | A1 | 3/2014 | Etri | |
| 2014/0111378 | A1 | 4/2014 | Etri | |
| 2015/0116148 | A1* | 4/2015 | Kim | G01S 19/215 |
| | | | | 342/357.59 |
| 2015/0226857 | A1* | 8/2015 | Davies | G01S 19/215 |
| | | | | 342/357.59 |
| 2015/0226858 | A1* | 8/2015 | Leibner | G01S 19/215 |
| | | | | 342/357.59 |
| 2016/0146944 | A1* | 5/2016 | Geren | G01S 19/215 |
| | | | | 342/357.59 |
| 2016/0371555 | A1* | 12/2016 | Derakhshani | G01S 7/539 |
| 2017/0227650 | A1* | 8/2017 | Grobert | G01S 19/215 |
| 2017/0357868 | A1* | 12/2017 | Derakhshani | G01S 15/89 |

* cited by examiner

FIG. 7

GLOBAL NAVIGATION SATELLITE SYSTEM (GNSS) NAVIGATION SOLUTION GENERATING APPARATUS AND METHOD

CROSS-REFERENCE TO RELATED APPLICATION

This application claims the priority benefit of Korean Patent Application No. 10-2015-0016119, filed on Feb. 2, 2015, in the Korean Intellectual Property Office, the disclosure of which is incorporated herein by reference.

BACKGROUND

1. Field of the Invention

The present invention relates to a method of navigating using a global positioning system (GPS) by consecutively tracking and re-obtaining normal GPS signals in lieu of tracking a spoofing signal when a spoofing attack is detected with respect to a global navigation satellite system (GNSS) signal, for example, a GPS.

2. Description of the Related Art

Recently, a global navigation satellite system (GNSS) system using a global positioning system (GPS) has been used throughout various industrial fields. However, a malicious intent to disrupt the GNSS system has also occurred.

As examples of a spoofing attack, a United States (US) drone was deceived in order to be captured by Iran and a successful experiment of hijacking a ship from a few kilometers away was conducted at the University of Texas. Therefore, the aforementioned examples may serve as evidence indicating that spoofing attacks may occur more frequently in the future.

A spoofing signal may generate a different position other than an actual position when a receiver does not detect a measurement value and data, by manipulating the measurement value and the data in a process of the receiver generating a navigation solution.

Accordingly, when the spoofing signal is detected, a determination on the detecting may be performed and then a normal GPS signal may be processed.

SUMMARY

An aspect of the present invention provides a method of estimating a signal feature parameter of a spoofing signal and realizing a feature of a spoofing signal source in response to a navigation receiver being influenced by the spoofing signal source.

According to an aspect of the present invention, there is provided a global navigation satellite system (GNSS) navigation solution generating apparatus, the apparatus including a determiner to determine that a spoofing signal exists in a received GNSS signal when a signal having a receiving intensity that is greater than a predetermined receiving intensity of a normal signal by a predetermined value range is included in the received GNSS signal, a detector to re-detect the normal signal from the GNSS signal when the spoofing signal is determined to exist, and a calculator to generate a GNSS navigation solution by tracking the re-detected normal signal, wherein the predetermined value range is 3 to 5 decibels (dB).

When the spoofing signal is determined not to exist, the detector may detect a first peak having a greatest receiving intensity and a second peak having a second greatest receiving intensity in the GNSS signal within a code searching range and a Doppler searching range, and detects a signal of the first peak as the normal signal when a ratio of the receiving intensity of the first peak to the receiving intensity of the second peak is greater than or equal to a threshold value. The detector may detect the signal of the first peak as the normal signal when the receiving intensity of the first peak is 1.5 times greater than or equal to the receiving intensity of the second peak.

When the spoofing signal is determined to exist, the detector may detect a first peak having a greatest receiving intensity, a second peak having a second greatest receiving intensity, and a third peak having a third greatest receiving intensity in the GNSS signal in a code searching range and a Doppler searching range, detects a signal of the first peak as the spoofing signal, and detects a signal of the second peak as the normal signal when a ratio of the receiving intensity of the second peak to the receiving intensity of the third peak is greater than or equal to a threshold value. The detector may detect the signal of the second peak as the normal signal when the receiving intensity of the second peak is 1.5 times greater than or equal to the receiving intensity of the third peak.

When the spoofing signal is determined to exist, the calculator may generate a replacement navigation solution to replace the GNSS solution using a replacement navigation system. The calculator may generate the replacement navigation solution using the replacement navigation system prior to the detector determining the normal signal to be separate from the spoofing signal. The detector may determine that the normal signal is separate from the spoofing signal when a difference between the spoofing signal and the normal signal is greater than or equal to one chip.

According to another aspect of the present invention, there is provided a GNSS navigation solution generating apparatus, the apparatus including a determiner to determine that a spoofing signal exists in a received GNSS signal when a signal having a receiving intensity that is greater than a predetermined receiving intensity of a normal signal by a predetermined value range is included in the received GNSS signal, a detector to detect the normal signal from the GNSS signal in a normal mode when the spoofing signal is determined not to exist and detect the normal signal from the GNSS signal in a spoofing mode when the spoofing signal is determined to exist, and a calculator to generate a GNSS navigation solution by tracking the detected normal signal.

When the detector is in the normal mode, the detector may detect a first peak having a greatest receiving intensity and a second peak having a second greatest receiving intensity in the GNSS signal within a code searching range and a Doppler searching range, and detects a signal of the first peak as the normal signal when a ratio of the receiving intensity of the first peak to the receiving intensity of the second peak is greater than or equal to a threshold value.

When the detector is in the spoofing mode, the detector may detect a first peak having a greatest receiving intensity, a second peak having a second greatest receiving intensity, and a third peak having a third greatest receiving intensity in the GNSS signal within a code searching range and a Doppler searching range, detects a signal of the first peak as the spoofing signal, and detects a signal of the second peak as the normal signal when a ratio of the receiving intensity of the second peak to the receiving intensity of the third peak is greater than or equal to a threshold value.

When the spoofing signal is determined to exist, the calculator may generate a replacement navigation solution to replace the GNSS solution using a replacement navigation system. The calculator may generate the replacement navigation solution using the replacement navigation system prior to the detector determining the normal signal is separate from the spoofing signal. The detector may determine that the normal signal is separate from the spoofing signal when a difference between the spoofing signal and the normal signal is greater than or equal to one chip.

According to still another aspect of the present invention, there is provided a GNSS navigation solution generating method, the method including determining that a spoofing signal exists in a received GNSS signal when a signal having a receiving intensity that is greater than a predetermined receiving intensity of a normal signal by a predetermined value range is included in the received GNSS signal, re-detecting the normal signal from the GNSS signal when the spoofing signal is determined to exist, and generating a GNSS navigation solution by tracking the re-detected normal signal.

The GNSS navigation solution generating method may further include detecting a first peak having a greatest receiving intensity and a second peak having a second greatest receiving intensity in the GNSS signal within a code searching range and a Doppler searching range, and detecting a signal of the first peak as the normal signal when a ratio of the receiving intensity of the first peak to the receiving intensity of the second peak is greater than or equal to a threshold value.

The re-detecting of the normal signal may include detecting a first peak having a greatest receiving intensity, a second peak having a second greatest receiving intensity, and a third peak having a third greatest receiving intensity in the GNSS signal within a code searching range and a Doppler searching range, detecting a signal of the first peak as the spoofing signal, and detecting a signal of the second peak as the normal signal when a ratio of the receiving intensity of the second peak to the receiving intensity of the third peak is greater than or equal to a threshold value.

When the spoofing signal is determined to exist, the GNSS navigation solution generating method may further include generating a replacement navigation solution to replace the GNSS solution using a replacement navigation system. The generating of the replacement navigation solution may include generating the replacement navigation solution prior to determining the normal signal to be separate from the spoofing signal.

Another aspect of the present invention also provides a method of overcoming a tracking of a spoofing signal in response to a navigation receiver being influenced by a spoofing signal source and consecutively tracking a normal global positioning system (GPS) signal.

When the attack of the spoofing signal is determined, a position of a normal signal is identified other than a position of a spoofing signal by re-performing a signal obtain process and perform a signal tracking based on information on the normal signal. A navigation solution may be calculated by tracking the normal signal in lieu of tracking the spoofing signal by a receiver. Accordingly, the attack of the spoofing signal may be efficiently overcome by re-performing obtaining a signal of the receiver in a spoofing mode.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
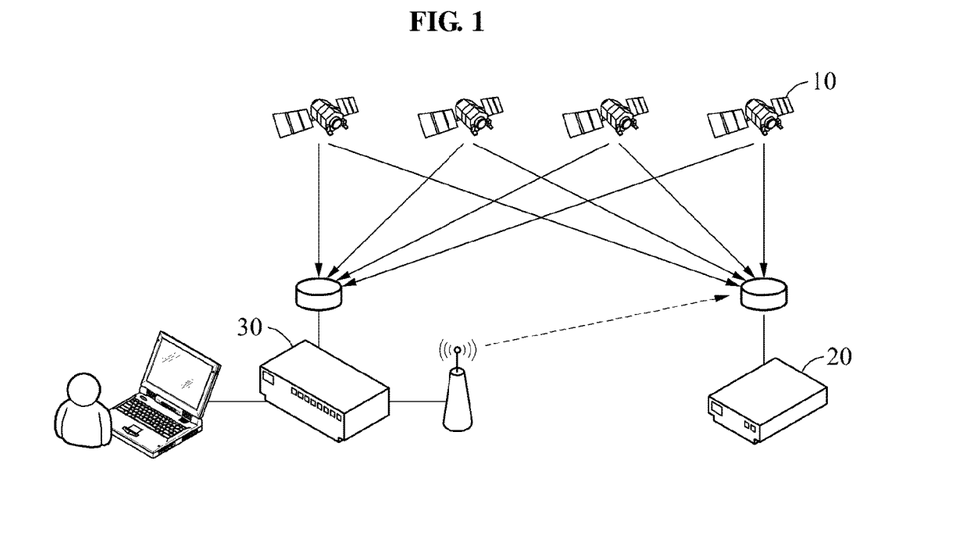
FIG. 1 is a diagram illustrating a type of spoofing attack according to an embodiment of the present invention.

FIG. 1 is a diagram illustrating a type of spoofing attack according to an embodiment of the present invention. A global navigation satellite system (GNSS) using a global positioning system (GPS) may transmit a GNSS signal synchronized in a GPS satellite 10 and generate position and time information by receiving the GNSS signal from a GPS receiver 20. A spoofing attacker 30 may generate and broadcast a spoofing signal synchronized with the GNSS signal in order to perform a spoofing attack with respect to the GNSS using the GPS.

The spoofing attacker 30 may maintain synchronization with the GPS receiver 20 by receiving the GPS signal in the same manner as the GPS receiver 20 which is a target of the spoofing attack. When the synchronization with the GPS receiver 20 is maintained, the spoofing attacker 30 may spoof a navigation solution of the GPS receiver 20 to be in a desired position by generating and broadcasting a spoofing signal that is similar to a normal signal actually transmitted from the GPS satellite 10. The spoofing signal may be broadcast as a signal that is 3 to 5 decibels (dB) greater than a generally received normal GPS signal and track the spoofing signal in lieu of tracking the normal GPS signal by the attack target receiver.

FIGS. 2A through 2D are diagrams illustrating a spoofing attack process based on a type of spoofing attack according to an embodiment of the present invention.

Figure 2A:
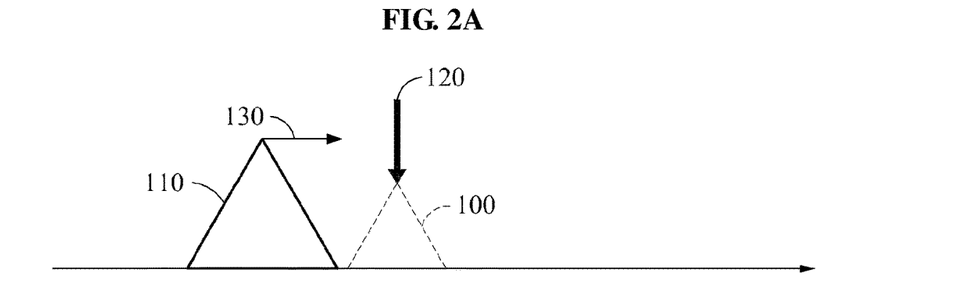
FIGS. 2A through 2D are diagrams illustrating a spoofing attack process based on a type of spoofing attack according to an embodiment of the present invention.

Referring to FIG. 2A, a GPS receiver tracks a signal at a signal tracking position 120 of a normal GPS signal 100, and a spoofing signal 110 is processed in a direction 130 toward the signal tracking position 120 of the normal GPS signal 100. In such an example, the GPS receiver is not under an influence of a spoofing attack.

Figure 2B:
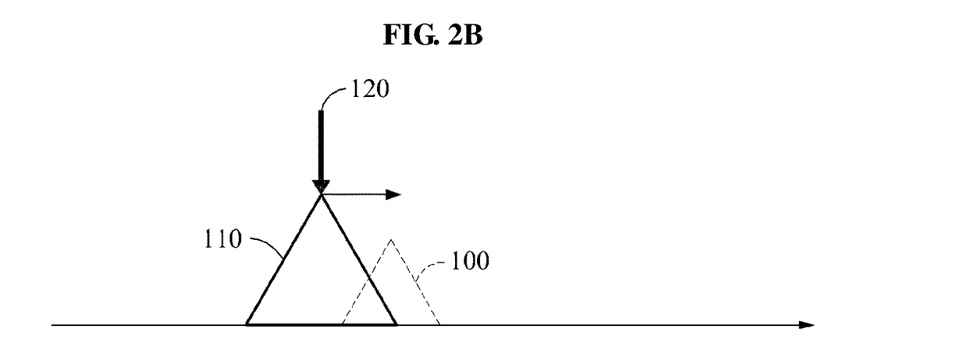

Referring to FIG. 2B, the spoofing signal 110 is combined with a portion of the normal GPS signal. In such an example, the signal tracking position 120 may move from a location of the normal GPS signal 100 to a location of the spoofing signal 110. Accordingly, a navigation solution of the GPS receiver may be changed due to the spoofing signal.

Figure 2C:
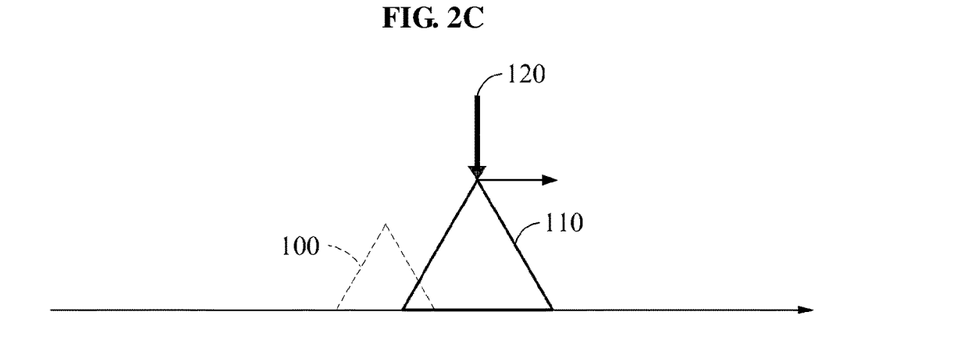

Referring to FIG. 2C, similar to FIG. 2B, the spoofing signal 110 is combined with a portion of the normal GPS signal 100. The GPS receiver may track a signal at the signal tracking position 120 of the spoofing signal 110 and move the signal tracking position 120 of the spoofing signal 110 according to an intention of a spoofing attacker.

Figure 2D:
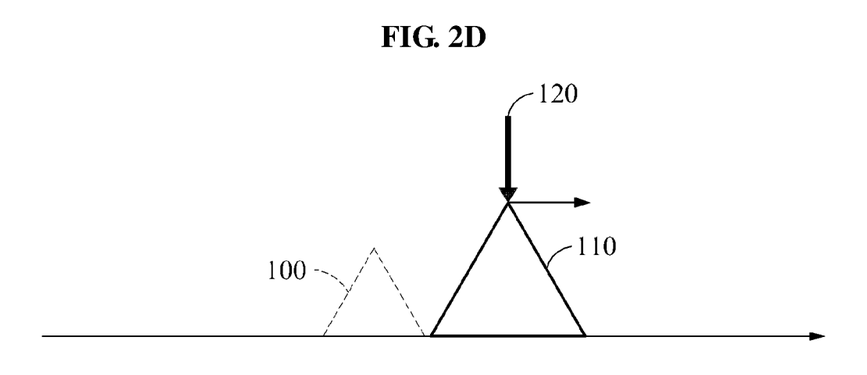

Referring to FIG. 2D, the spoofing signal 110 is completely separate from the normal GPS signal 100. The GPS receiver may track a signal at the signal tracking position 120 of the spoofing signal and may spoof the GPS receiver which is a target of the spoofing attack according to the intention of the spoofing attacker.

Figure 3:
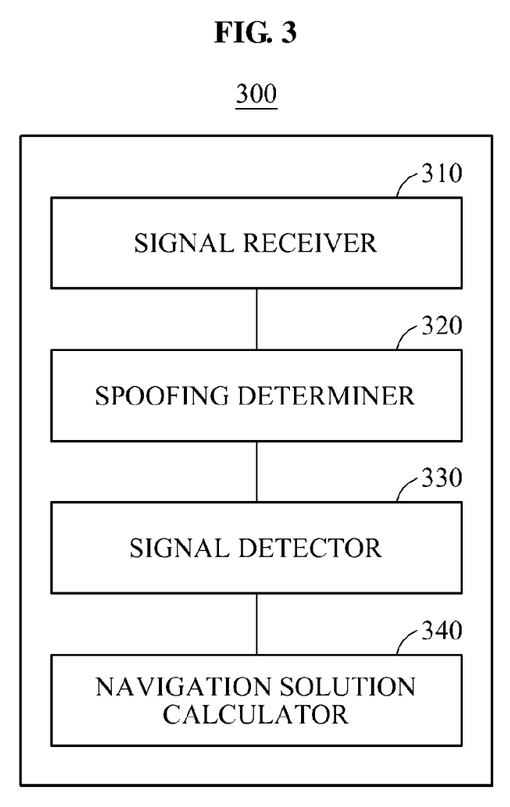
FIG. 3 is a diagram illustrating a global navigation satellite system (GNSS) generating apparatus according to an embodiment of the present invention.

FIG. 3 is a diagram illustrating a global navigation satellite system (GNSS) generating apparatus 300 for overcoming a spoofing attack and tracking a normal signal after a spoofing signal is determined to exist according to an embodiment of the present invention.

A signal receiver 310 may perform a function of searching for information on a Doppler frequency and a code position with respect to a GPS signal in order to navigate via a GPS. For example, the signal receiver 310 may use a correlation feature of a code and a frequency. Concisely, a feature of increasing a signal intensity when a received signal corresponds to information on the code may be used.

A spoofing determiner 320 determines whether a spoofing signal exists in a GPS signal received from the signal receiver 310. The received spoofing signal may have a receiving intensity greater than a receiving intensity of a generally received normal GPS signal. For example, the received spoofing signal may have a receiving intensity 3 to 5 dB greater than a receiving intensity of the generally received normal GPS signal. Accordingly, when a signal having a receiving intensity that is greater than a predetermined receiving intensity of a normal signal by a predetermined value range is included in the received GPS signal, the spoofing signal may be determined to exist in the received GPS signal.

Figure 5:
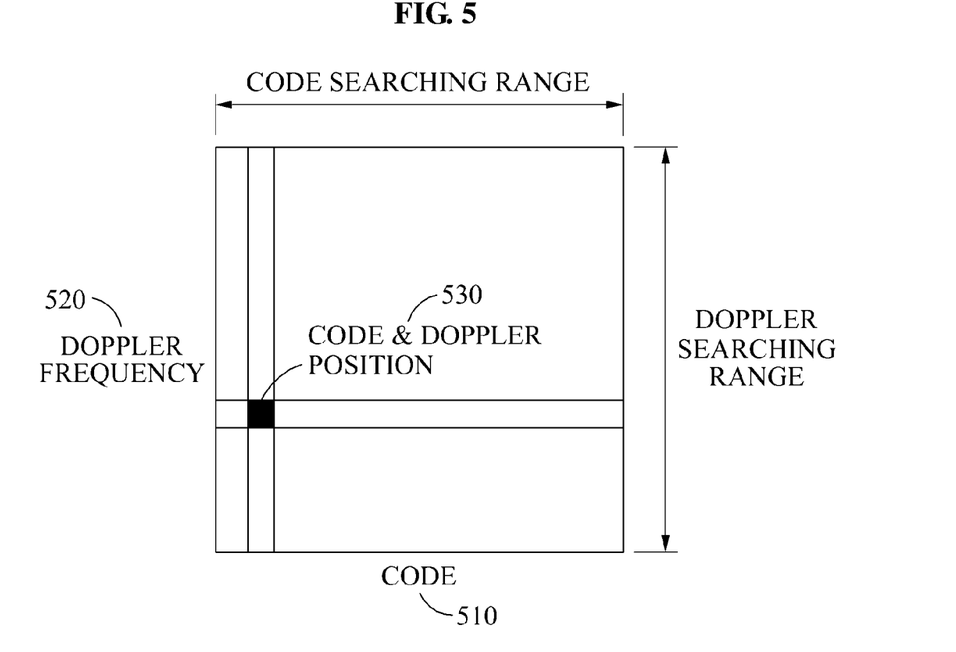
FIG. 5 is a diagram illustrating a code and Doppler position to obtain a signal within a code searching range and a Doppler searching range according to an embodiment of the present invention.

A signal detector 330 detects a normal signal from the received GPS signal. The signal detector 330 may calculate a receiving intensity value of a signal at every code position within a code searching range and every Doppler position within a Doppler searching range, and detect the normal signal based on the calculated receiving intensity value. Referring to FIG. 5, a code and Doppler position 530 within a code searching range 510 and a Doppler searching range 520 is illustrated. When a receiving intensity value of a signal is calculated at every code position and every Doppler position, a total number of the calculated receiving intensity values will be (a number of codes)×(a number of Doppler frequencies).

Figure 6:
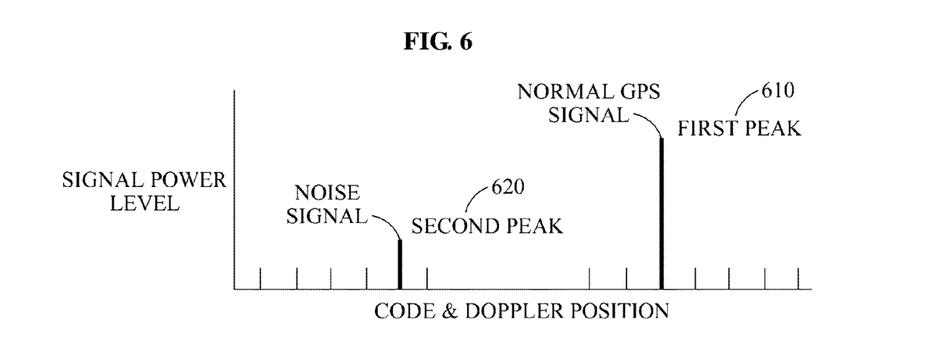
FIG. 6 is a diagram illustrating a receiving intensity of a received signal within a code searching range and a Doppler searching range according to an embodiment of the present invention.

When the spoofing determiner 320 determines that the spoofing signal does not exist in the received GPS signal, the signal detector 330 may operate in a normal mode in order to detect the normal signal from the received GPS signal. In the normal mode, the signal detector 330 may detect a first peak having a greatest receiving intensity and a second peak having a second greatest receiving intensity from the calculated total receiving intensity value. Referring to FIG. 6, a first peak 610 and a second peak 620 according to a code and Doppler position are illustrated. The signal detector 330 may calculate a peak ratio of the first peak 610 to the second peak 620 as shown in Equation 1.

$$\text{Peak\_Ratio} = \frac{\text{First\_Peak}}{\text{Second\_Peak}} \qquad \text{[Equation 1]}$$

When the peak ratio is calculated as shown in Equation 1, the signal detector 330 may detect the normal signal only when the peak ratio is greater than a value of an Acquisition_Threshold which is a predetermined threshold value used to detect a normal signal, as shown in Equation 2.

$$\text{Peak\_Ratio} > \text{Acquisition\_Threshold} \qquad \text{[Equation 2]}$$

When the peak ratio is greater than the value of Acquisition_Threshold, a code and Doppler position at the first peak 610 may be determined as being information of the normal signal. When only the normal GPS signal is received, the first peak 610 may be a receiving intensity value of the normal signal and the second peak 620 may be a receiving intensity value of a noise component. A ratio of the first peak 610 to the second peak 620 may generally have a value greater than or equal to 1.5. For example, the value of Acquisition_Threshold which is a reference value for determining whether the normal signal is detected may be set to be 1.5.

Figure 7:
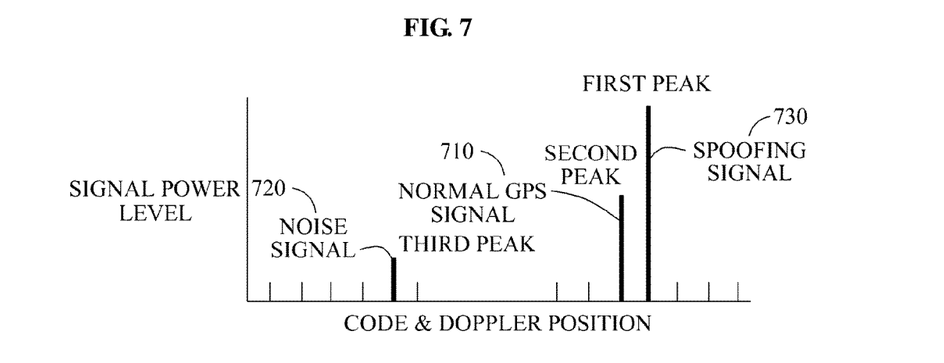
FIG. 7 is a diagram illustrating a receiving intensity of a received signal within a code searching range and a Doppler searching range according to another embodiment of the present invention.

When the spoofing determiner 320 determines that the spoofing signal exists in the GPS signal, the signal detector 330 may operate in a spoofing mode in order to detect the normal signal from the received GPS signal. When the normal signal is detected based on an identical scheme used in the normal mode despite existence of the spoofing signal, a target of the signal tracking may be changed from a code position 720 of a normal signal to a code position 710 with respect to a spoofing signal. When a navigation solution is generated by tracking the spoofing signal, an inappropriate navigation solution may be generated. Accordingly, the normal signal is re-detected in the spoofing mode such that the spoofing signal is not detected as the normal signal. The signal detector 330 may detect a first peak having a greatest receiving intensity, a second peak having a second greatest receiving intensity, and a third peak having a third greatest receiving intensity from the calculated total receiving intensity value. Referring to FIG. 7, a first peak 710, a second peak 720, and a third peak 730 according to a code and Doppler position are illustrated. As illustrated in FIG. 6, only the noise component and the normal signal are detected in the normal mode. However, in the spoofing mode, the spoofing signal having a receiving intensity that is greater than a receiving intensity of the normal signal by a predetermined value may be detected. In the spoofing mode, the first peak 710 may be determined to be the spoofing signal and the second peak 720 may be detected as the normal signal. Here, a peak ratio of the second peak 720 to the third peak 730 may be required to be greater than the value of Acquisition_Threshold which is a predetermined threshold value for detecting normal signal, in order to determine a code and Doppler position at the second peak 720 as being information of the normal signal.

In the spoofing mode, the signal detector 330 may determine whether the spoofing signal existing in the received GPS signal is separate from the normal signal. As illustrated in FIGS. 2B and 2C, when the normal signal is tracked in a section in which the normal signal and the spoofing signal are combined, the normal signal may be spoofed again since the normal signal is still in an influential range of the spoofing signal. Accordingly, although the normal signal is correctly detected, the navigation solution generated by tracking the detected normal signal may not be trustworthy prior to the spoofing signal being determined to be separate from the normal signal. When an attack by the spoofing signal does not occur with the normal signal within one chip, the spoofing signal may not influence the normal signal. Accordingly, when a difference between the spoofing signal and the normal signal is greater than or equal to one chip, the signal detector 330 may determine that the spoofing signal is separate from the normal signal. When the spoofing signal is determined to be separate from the normal signal, the signal detector 330 may operate in the normal mode in order to detect the normal signal from the received GPS signal prior to the spoofing determiner 320 once again determining that the spoofing signal exists in the received GPS signal.

A navigation solution calculator 340 may generate the navigation solution based on information on a Doppler frequency and a code position with respect to the GPS signal detected as the normal signal by the signal detector 330. In order to generate the navigation solution, the navigation solution calculator 340 may calculate a position of a receiver based on a navigation message and pseudo-range measurement information generated in response to a signal tracking result. When the spoofing determiner 320 determines that the spoofing signal exists in the received GPS signal, the navigation solution calculator 340 may stop generating the navigation solution and track a signal detected by the signal detector 330 and generate the navigation solution using a replacement navigation system. The navigation solution calculator 340 may generate the navigation solution using the replacement navigation system prior to the signal detector 330 determining the spoofing signal to be separate from the normal signal. When the spoofing signal is determined to be separate from the normal signal, the navigation solution calculator 340 may generate the navigation solution based on the information on the Doppler frequency and the code position with respect to the GPS signal detected as the normal signal by the signal detector 330, prior to the spoofing determiner 320 determining again that the spoofing signal exists in the received GPS signal. The navigation solution calculator 340 may generate consecutive navigation solutions while the normal signal is influenced by the spoofing signal, using the replacement system.

Figure 4:
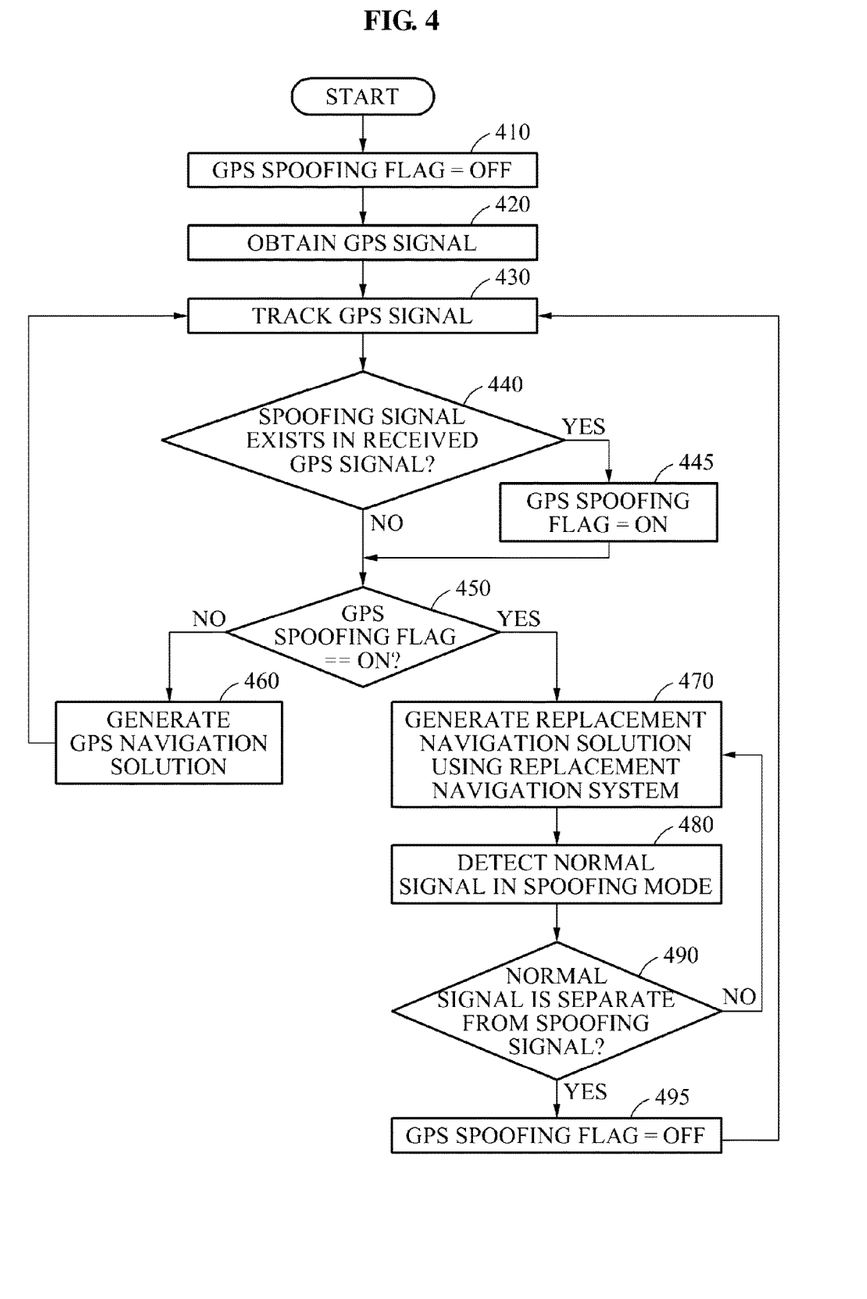
FIG. 4 is a flowchart illustrating a GNSS navigation solution generating method according to an embodiment of the present invention.

FIG. 4 is a flowchart illustrating a GNSS navigation solution generating method of overcoming a spoofing attack and tracking a normal signal after a spoofing signal is determined to exist according to an embodiment of the present invention.

In operation 410, the GNSS navigation solution generating method may be initialized. A GPS spoofing flag may be set to have an OFF value indicating whether a spoofing signal exists in a receiving signal.

In operation 420, a function of searching information on a Doppler frequency and a code position with respect to a GPS signal may be performed in order to perform GPS navigation. For example, a correlation feature of a code and a frequency may be used to obtain a GPS signal.

In operation 430, the GPS signal may be consecutively tracked based on the information on the Doppler frequency and the code position with respect to the GPS signal determined in operation 420. In order to track the GPS signal, the information on the Doppler frequency and a time-based code position may be determined using a tracking loop and a carrier wave tracking loop.

In operation 440, the spoofing signal may be determined to exist in the received GPS signal. The received spoofing signal may have a greater receiving intensity than a receiving intensity of a generally received normal GPS signal. For example, the received spoofing signal may have a receiving intensity 3 to 5 dB greater than a receiving intensity of the generally received normal GPS signal. Accordingly, in operation 440, when a signal having a receiving intensity that is greater than a predetermined receiving intensity of a normal signal by a predetermined value range is included in the received GPS signal, the spoofing signal may be determined to exist in the received GPS signal.

In operation 445, the GPS spoofing flag may be set to have an ON value when the spoofing signal is determined not to exist in the GPS signal in operation 440.

In operation 450, a spoofing mode or a normal mode may be selected based on a value of the GPS spoofing flag. When the GPS spoofing flag has the ON value, a navigation solution may be generated in the spoofing mode. When the GPS spoofing flag has the OFF value, the navigation solution may be generated in the normal mode.

When the normal mode is selected in operation 450, operation 460 is processed. In operation 460, a receiving intensity value of a signal at every code position within a code searching range and every Doppler position within a Doppler searching range may be calculated, and the normal signal may be detected based on the calculated receiving intensity value. The first peak 610 having a greatest receiving intensity and the second peak 620 having a second greatest receiving intensity may be detected from the calculated total receiving intensity value. Also, the peak ratio of the first peak 610 to the second peak 620 may be calculated as shown in Equation 1. The normal signal may be detected only when the peak ratio is greater than the value of Acquisition_Threshold which is a predetermined threshold value used to detect a normal signal. When the peak ratio is greater than the value of Acquisition_Threshold, a code and Doppler position at the first peak 610 may be determined as being information of the normal signal. When only the normal GPS signal is received, the first peak 610 may be a receiving intensity value of the normal signal and the second peak 620 may be a receiving intensity value of a noise component. For example, the value of Acquisition_Threshold which is a reference for determining whether the normal signal is detected may be set to be 1.5.

In operation 460, the navigation solution may be generated based on the information on the Doppler frequency and the code position with respect to the GPS signal detected as the normal signal. In order to generate the navigation solution, a position of a receiver may be calculated based on a navigation message and pseudo-range measurement information generated in response to a signal tracking result.

When the spoofing mode is selected in operation 450, operation 470 is processed. In operation 470, a replacement navigation solution may be generated using a replacement navigation system. Since the replacement navigation solution is provided while the normal signal is influenced by the spoofing signal, the navigation solution may be generated using the replacement navigation solution until the spoofing signal being determined to be separate from the normal signal. The consecutive navigation solutions may be generated by the replacement system when the normal signal is influenced by the spoofing signal.

In operation 480, the normal signal may be re-detected so that the spoofing signal is not detected as the normal signal. The first peak 710 having the greatest receiving intensity, the second peak 720 having the second greatest receiving intensity, and the third peak 730 having the third greatest receiving intensity may be detected from the calculated total receiving intensity value. The first peak 710 may be determined to be the spoofing signal and the second peak 720 may be detected as the normal signal. Here, the peak ratio of the second peak 720 to the third peak 730 may be required to be greater than the value of Acquisition_Threshold which is a predetermined threshold value used to detect a normal signal, in order to determine a code and Doppler position at the second peak 720 as being information of the normal signal.

In operation 490, whether the spoofing signal existing in the received GPS signal is separate from the normal signal may be determined. When a difference between the spoofing signal and the normal signal is greater than or equal to one chip, the spoofing signal may be determined to be separate from the normal signal.

When the spoofing signal is determined not to be separate from the normal signal in operation 490, the received GPS signal is still influenced by the spoofing signal. Accordingly, operation 470 is once again processed to ensure that the navigation solution is not spoofed.

When the spoofing signal is determined to be separate from the normal signal, the GPS spoofing flag may be set to have the OFF value in operation 495. Since the received GPS signal is not influenced by the spoofing signal, the GPS signal may be consecutively tracked by returning to operation 430.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A global navigation satellite system (GNSS) navigation solution generating apparatus, the apparatus comprising:
a determiner configured to determine that a spoofing signal exists in a received GNSS signal when a signal having a receiving intensity that is greater than a predetermined receiving intensity of a normal signal by a predetermined value range is included in the received GNSS signal;
a detector configured to re-detect the normal signal from the GNSS signal when the spoofing signal is determined to exist; and
a calculator configured to generate a GNSS navigation solution by tracking the re-detected normal signal,
wherein the detector detects signal peaks within a code searching range and a Doppler searching range.

2. The apparatus of claim 1, wherein the predetermined value range is 3 to 5 decibels (dB).

3. The apparatus of claim 1, wherein when the spoofing signal is determined not to exist, the detector detects a first peak having a greatest receiving intensity and a second peak having a second greatest receiving intensity in the GNSS signal within the code searching range and the Doppler searching range, and detects a signal of the first peak as the normal signal when a ratio of the receiving intensity of the first peak to the receiving intensity of the second peak is greater than or equal to a threshold value.

4. The apparatus of claim 3, wherein the detector detects the signal of the first peak as the normal signal when the receiving intensity of the first peak is 1.5 times greater than or equal to the receiving intensity of the second peak.

5. The apparatus of claim 1, wherein when the spoofing signal is determined to exist, the detector detects a first peak having a greatest receiving intensity, a second peak having a second greatest receiving intensity, and a third peak having a third greatest receiving intensity in the GNSS signal in the code searching range and the Doppler searching range, detects a signal of the first peak as the spoofing signal, and detects a signal of the second peak as the normal signal when a ratio of the receiving intensity of the second peak to the receiving intensity of the third peak is greater than or equal to a threshold value.

6. The apparatus of claim 5, wherein the detector detects the signal of the second peak as the normal signal when the receiving intensity of the second peak is 1.5 times greater than or equal to the receiving intensity of the third peak.

7. The apparatus of claim 1, wherein when the spoofing signal is determined to exist, the calculator generates a replacement navigation solution to replace the GNSS solution using a replacement navigation system.

8. The apparatus of claim 7, wherein the calculator generates the replacement navigation solution using the replacement navigation system prior to the detector determining the normal signal to be separate from the spoofing signal.

9. The apparatus of claim 1, wherein the detector determines that the normal signal is separate from the spoofing signal when a difference between the spoofing signal and the normal signal is greater than or equal to one chip.

10. A global navigation satellite system (GNSS) navigation solution generating apparatus, the apparatus comprising:
a determiner configured to determine that a spoofing signal exists in a received GNSS signal when a signal having a receiving intensity that is greater than a predetermined receiving intensity of a normal signal by a predetermined value range is included in the received GNSS signal;
a detector configured to detect the normal signal from the GNSS signal in a normal mode when the spoofing signal is determined not to exist and detect the normal signal from the GNSS signal in a spoofing mode when the spoofing signal is determined to exist; and
a calculator configured to generate a GNSS navigation solution by tracking the detected normal signal,
wherein the detector detects signal peaks within a code searching range and a Doppler searching range.

11. The apparatus of claim 10, wherein when the detector is in the normal mode, the detector detects a first peak having a greatest receiving intensity and a second peak having a second greatest receiving intensity in the GNSS signal within the code searching range and the Doppler searching range, and detects a signal of the first peak as the normal signal when a ratio of the receiving intensity of the first peak to the receiving intensity of the second peak is greater than or equal to a threshold value.

12. The apparatus of claim 10, wherein when the detector is in the spoofing mode, the detector detects a first peak having a greatest receiving intensity, a second peak having a second greatest receiving intensity, and a third peak having a third greatest receiving intensity in the GNSS signal within the code searching range and the Doppler searching range, detects a signal of the first peak as the spoofing signal, and detects a signal of the second peak as the normal signal when a ratio of the receiving intensity of the second peak to the receiving intensity of the third peak is greater than or equal to a threshold value.

13. The apparatus of claim 10, wherein when the spoofing signal is determined to exist, the calculator generates a replacement navigation solution to replace the GNSS solution using a replacement navigation system.

14. The apparatus of claim 13, wherein the calculator generates the replacement navigation solution using the replacement navigation system prior to the detector determining the normal signal to be separate from the spoofing signal.

15. The apparatus of claim 10, wherein the detector determines that the normal signal is separate from the spoofing signal when a difference between the spoofing signal and the normal signal is greater than or equal to one chip.

* * * * *